United States Patent
Wilkerson

(10) Patent No.: US 8,335,494 B2
(45) Date of Patent: Dec. 18, 2012

(54) PROVISIONING OF CALLBACK REMINDERS ON A VEHICLE-BASED COMPUTING SYSTEM

(75) Inventor: Brian Y. Wilkerson, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/981,715

(22) Filed: Dec. 30, 2010

(65) Prior Publication Data

US 2012/0172009 A1    Jul. 5, 2012

(51) Int. Cl.
*H04M 3/42* (2006.01)
(52) U.S. Cl. .............. 455/414.1; 455/41.3; 455/569.1; 455/569.2; 379/210.01
(58) Field of Classification Search ................ 455/414.1
See application file for complete search history.

(56) References Cited

U.S. PATENT DOCUMENTS

| | | | |
|---|---|---|---|
| 6,028,537 A | 2/2000 | Suman et al. | |
| 6,278,772 B1 | 8/2001 | Bowater et al. | |
| 6,385,535 B2 | 5/2002 | Ohishi et al. | |
| 6,411,899 B2 | 6/2002 | Dussell et al. | |
| 6,459,969 B1 | 10/2002 | Bates et al. | |
| 6,505,780 B1 | 1/2003 | Yassin et al. | |
| 6,600,975 B2 | 7/2003 | Moriguchi et al. | |
| 6,993,490 B2 | 1/2006 | Chen et al. | |
| 7,120,928 B2 | 10/2006 | Sheth et al. | |
| 7,139,722 B2 | 11/2006 | Perrella et al. | |
| 7,142,664 B2 | 11/2006 | Seligmann | |
| 7,145,998 B1 | 12/2006 | Holder et al. | |
| 7,283,813 B2 | 10/2007 | Hamanaga et al. | |
| 7,346,630 B2 | 3/2008 | Eichstaedt et al. | |
| 7,376,226 B2 | 5/2008 | Holder et al. | |
| 7,433,714 B2 | 10/2008 | Howard et al. | |
| 7,444,384 B2 | 10/2008 | Horvitz | |
| 7,469,827 B2 | 12/2008 | Katragadda et al. | |
| 7,474,264 B2 | 1/2009 | Bolduc et al. | |
| 7,586,956 B1 | 9/2009 | Mishra et al. | |
| 7,813,950 B2 | 10/2010 | Perrella et al. | |
| 7,889,096 B2 | 2/2011 | Breed | |

(Continued)

FOREIGN PATENT DOCUMENTS

JP    2007205872 A    8/2007

(Continued)

OTHER PUBLICATIONS

Ford Motor Company, "SYNC with Navigation System," Owner's Guide Supplement, SYNC System Version 1 (Jul. 2007).

(Continued)

*Primary Examiner* — Charles Appiah
*Assistant Examiner* — Mazda Sabouri
(74) *Attorney, Agent, or Firm* — Jennifer M. Stec; Brooks Kushman P.C.

(57) ABSTRACT

One or more embodiments include a computer-implemented method and system for providing reply reminders to a vehicle occupant in a vehicle. Information indicating one or more unanswered communications from a nomadic telephone device may be wirelessly received at a vehicle computer. Time and/or date information for the unanswered communication may also be received. By automatically monitoring a passage of time, a determination may be made if one or more unanswered communications have been answered within a predefined reply period. If the one or more unanswered communications have not been answered within the predefined reply period, a reply reminder may be generated and presented in a vehicle.

6 Claims, 5 Drawing Sheets

U.S. PATENT DOCUMENTS

| | | | |
|---|---|---|---|
| 2002/0107032 A1 | 8/2002 | Agness et al. | |
| 2004/0073643 A1 | 4/2004 | Hayes et al. | |
| 2004/0192270 A1 | 9/2004 | Kreitzer | |
| 2004/0220768 A1 | 11/2004 | Klein | |
| 2005/0019228 A1 | 1/2005 | Myers et al. | |
| 2005/0088284 A1 | 4/2005 | Zai et al. | |
| 2006/0058948 A1 | 3/2006 | Blass et al. | |
| 2006/0290490 A1 | 12/2006 | Kraus et al. | |
| 2007/0042812 A1* | 2/2007 | Basir | 455/569.2 |
| 2007/0120948 A1 | 5/2007 | Fujioka et al. | |
| 2007/0285256 A1 | 12/2007 | Batra | |
| 2008/0057927 A1 | 3/2008 | Han | |
| 2008/0086455 A1 | 4/2008 | Meisels et al. | |
| 2008/0319653 A1 | 12/2008 | Moshfeghi | |
| 2008/0319665 A1 | 12/2008 | Berkobin et al. | |
| 2009/0005966 A1 | 1/2009 | McGray et al. | |
| 2009/0075624 A1 | 3/2009 | Cox et al. | |
| 2009/0111422 A1 | 4/2009 | Bremer et al. | |
| 2009/0144622 A1 | 6/2009 | Evans et al. | |
| 2009/0248285 A1 | 10/2009 | Bauer | |
| 2009/0267757 A1 | 10/2009 | Nguyen | |
| 2009/0312901 A1 | 12/2009 | Miller et al. | |
| 2010/0062714 A1 | 3/2010 | Ozaki | |
| 2010/0136944 A1 | 6/2010 | Taylor et al. | |
| 2010/0148920 A1 | 6/2010 | Philmon et al. | |
| 2010/0227629 A1 | 9/2010 | Cook et al. | |
| 2010/0228803 A1 | 9/2010 | Quinn | |
| 2010/0233957 A1 | 9/2010 | Dobosz | |
| 2010/0274689 A1 | 10/2010 | Hammad et al. | |
| 2010/0274865 A1 | 10/2010 | Frazier et al. | |
| 2010/0287024 A1 | 11/2010 | Ward et al. | |
| 2011/0021234 A1 | 1/2011 | Tibbitts et al. | |
| 2011/0039581 A1 | 2/2011 | Cai et al. | |
| 2011/0045810 A1* | 2/2011 | Issa et al. | 455/418 |
| 2011/0137520 A1 | 6/2011 | Rector et al. | |
| 2011/0137773 A1 | 6/2011 | Davis, III et al. | |
| 2011/0176670 A1* | 7/2011 | Kaplan et al. | 379/210.01 |
| 2011/0298924 A1 | 12/2011 | Miller et al. | |
| 2011/0300843 A1 | 12/2011 | Miller et al. | |
| 2011/0300884 A1* | 12/2011 | Ollila et al. | 455/466 |
| 2012/0010805 A1 | 1/2012 | Wilkerson | |
| 2012/0158658 A1 | 6/2012 | Wilkerson | |

FOREIGN PATENT DOCUMENTS

| | | |
|---|---|---|
| JP | 2008172820 A | 7/2008 |
| WO | 03107129 A2 | 12/2003 |
| WO | 2011016886 A1 | 2/2011 |

OTHER PUBLICATIONS

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem", Automotive Design & Production, Oct. 2003, http://findarticles.com, pp. 1-3.

Christoph Hammerschmidt, Melexis, The Sky's the Limit, Continental NXP to integrate NFC into cars, Feb. 17, 2011, http://automotive-eetimes.com/en/continental-nxp-to-integrate-nfc-into-cars.html?cmp_id=.

* cited by examiner

PROVISIONING OF CALLBACK REMINDERS ON A VEHICLE-BASED COMPUTING SYSTEM

BACKGROUND

1. Technical Field

In one or more embodiments, reminders are provided to a user for unanswered communications received on a computing device. In some embodiments, characteristics about the unanswered communications and/or the incoming and outgoing communications may be used to determine when to provide the reminders. In some embodiments, the unanswered communications may be received in and/or out of a vehicle, but the reply reminders may be provided in the vehicle.

2. Background Art

Mobile phones typically have a call history log that logs all incoming, outgoing, and missed calls to the mobile phone. If the contact is stored in the mobile phone's phonebook, the call history log will show information identifying the contact such as a name and/or phone number. If the contact is not stored, a number typically is displayed in the call log. Additionally, many mobile phones are also capable of facilitating other communications such as short messaging service (SMS), text messages, electronic mail, and the like.

There are various examples of systems that provide callback reminders for missed telephone calls. For example, U.S. Pat. No. 7,145,998 to Holder et al. discloses systems, methods, and devices for a callback/callback reminder feature. A telecommunications device includes a receiver for receiving an incoming call and a processor in communication with the receiver. The processor has a callback/callback reminder module for automatically calling back a calling party of an incoming call or for sending a user a reminder to callback the calling party.

SUMMARY

In one aspect, a computer-implemented method for providing reply reminders to a vehicle occupant in a vehicle may include wirelessly receiving, at a vehicle computer, information indicating one or more unanswered communications from a nomadic telephone device. The unanswered communications may include, but are not limited to, a phone call, electronic mail or text message. Additionally, time and/or date information for the unanswered communication may also be received. The method may also include automatically monitoring, at the vehicle computer, a passage of time based on the reply period. The reply period may be defined based on the time and/or date information. If the one or more unanswered communications have not been answered within the reply period, a reminder at the vehicle computer may be generated and presented in a vehicle.

In some embodiments, the method may also include receiving at the vehicle computer one or more outgoing calls from the nomadic telephone device and comparing one or more unanswered calls with the one or more outgoing calls to determine if a correspondence exists between the calls. The callback reminder may be presented at the vehicle computer if the correspondence does not exist.

In some embodiments, an unanswered call may be designated as a priority based on particular information (e.g., and without limitation, relationship information between a caller and a call recipient). In such cases, the reply period may be modified based on designating the one or more unanswered call as a priority.

In an additional aspect, a system for providing callback reminders to a vehicle occupant in a vehicle may include at least on vehicle computer. The vehicle computer may be configured to receive information defining one or more unanswered calls from a nomadic telephone device, and information defining multiple connected incoming calls and/or multiple outgoing calls from the nomadic telephone device. The vehicle computer may be further configured to identify one or more call characteristics of the incoming calls and/or outgoing calls (e.g., and without limitation, frequency of the calls or a time period within which a call is received or made).

Further, a determination may be if the one or more unanswered calls have been answered and when to present a callback reminder based on the one or more call characteristics. If the one or more unanswered calls have not been answered, the vehicle computer may be further configured to present a callback reminder in the vehicle based on when to present the callback reminder.

In an additional aspect, a method includes receiving information at a vehicle computer defining unanswered communications and outgoing communications and determining a time and/or date for the unanswered communications. A reply period may be defined for the unanswered communication based on the time and/or date. It may be determined if a correspondence within the reply period exists between the outgoing and unanswered communications. If not, a reminder from the vehicle computer may be presented.

These and other aspects will be better understood in view of the attached drawings and following detailed description of the invention.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages thereof, may best be understood with reference to the following description, taken in connection with the accompanying drawings, in which:

DETAILED DESCRIPTION

As a person's schedule gets busier, it is sometimes harder to remember to call back a missed call. The same holds true for other communication such as text messages and electronic mail. In some cases, a significant period of time can pass before the person replies. In other cases, the person may never reply.

For missed phone calls, an alarm can be set by a mobile phone user as a reminder to return missed calls. However, in many cases, setting an alarm can be inconvenient to the user, for example, when driving. Furthermore, to have the busy user set an alarm only exacerbates the problem rather than solving it. For example, the busy user will also have to remember to set the alarm.

Detailed embodiments of the invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Figure 1:
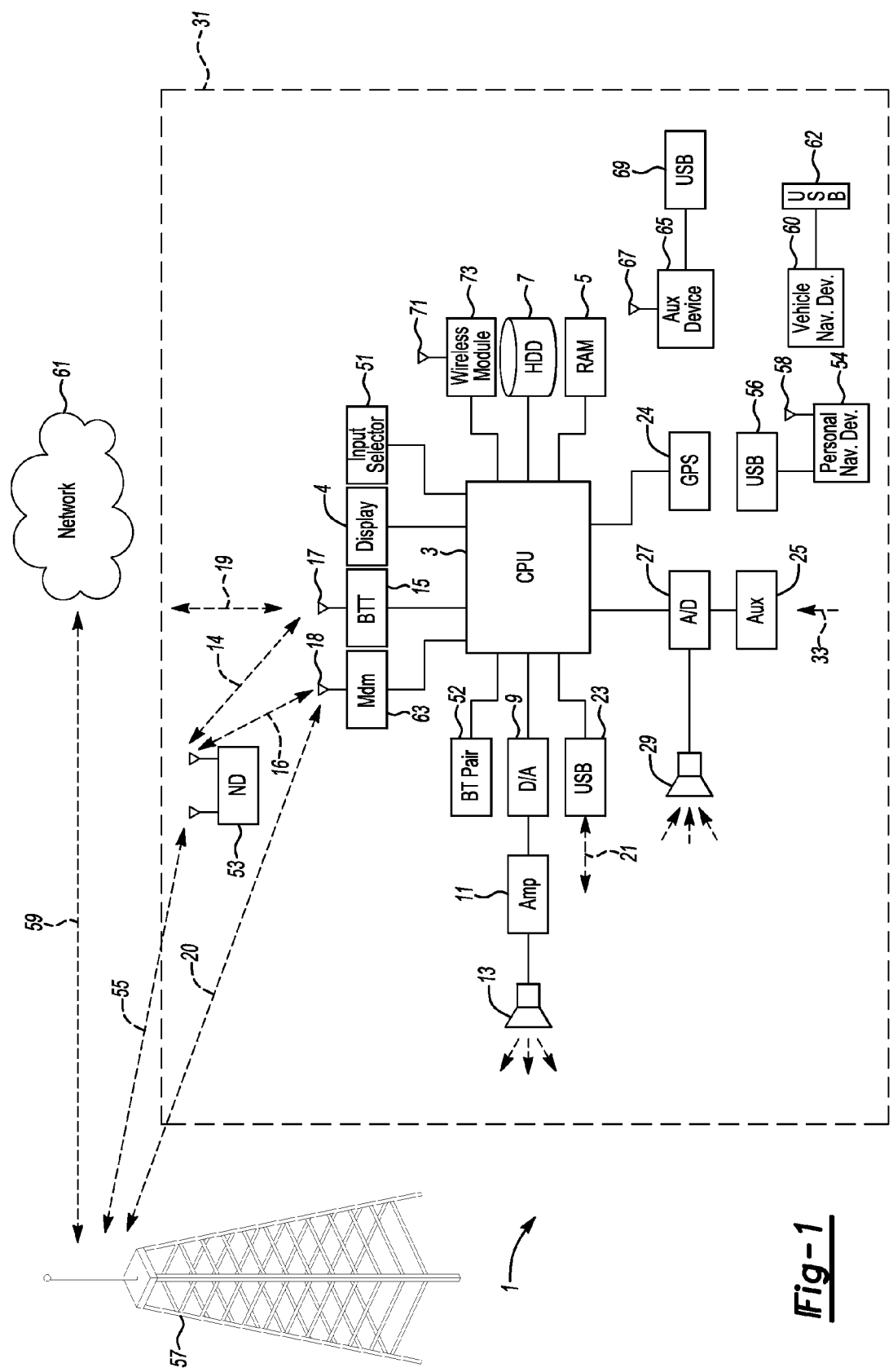
FIG. 1 is an example block topology of a vehicle infotainment computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73. Auxiliary device 65 may include, but are not limited to, personal media players, wireless health devices, portable computers, and the like.

Figure 2:
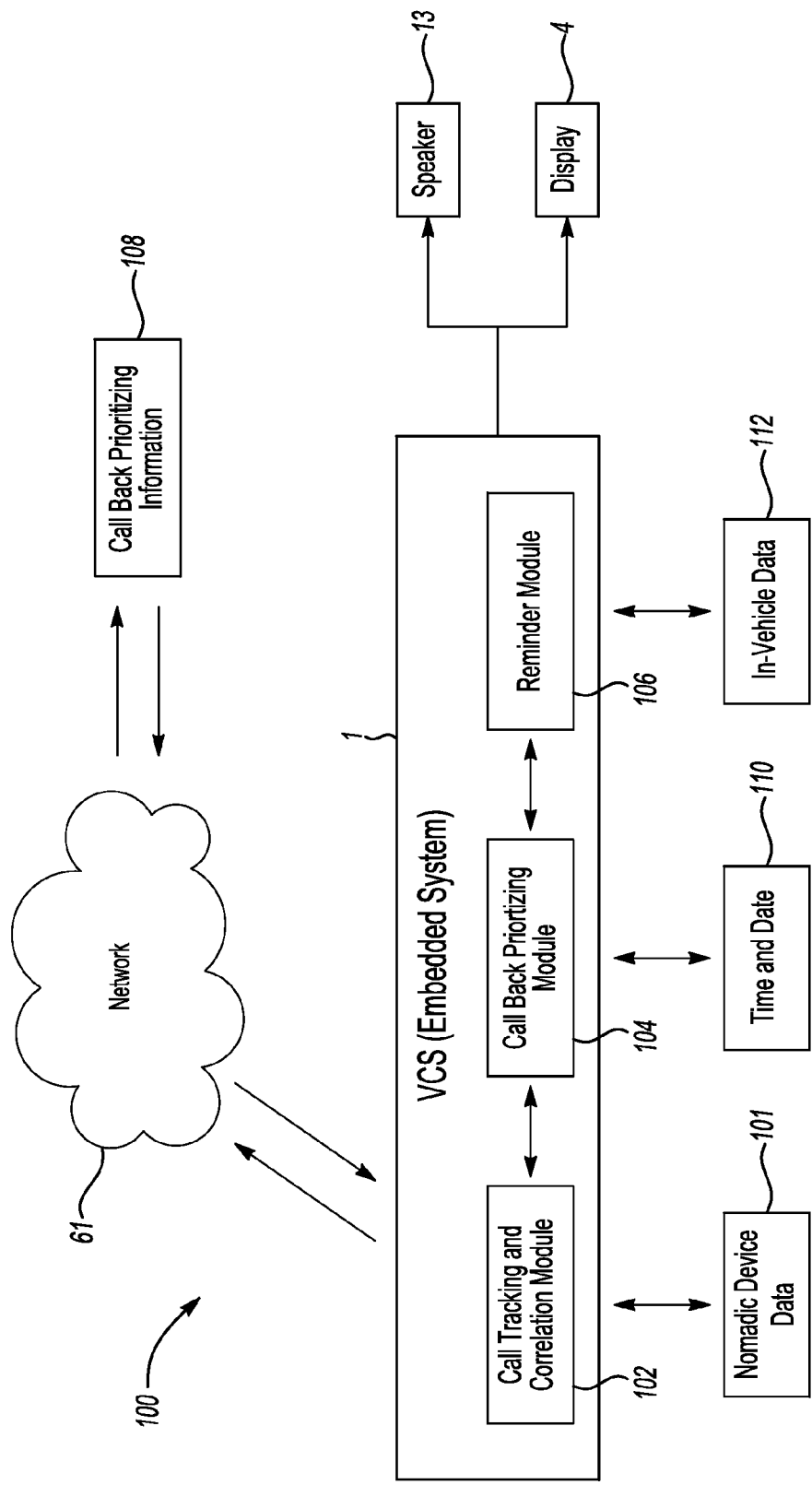
FIG. 2 is an example block topology of the VCS of FIG. 1 illustrating exemplary modules involved in issuing callback reminders to a vehicle occupant.

FIG. 2 is block topology of a system for issuing communication reply reminders. In the non-limiting embodiment illustrated in FIG. 2, the reminders may be received by a vehicle occupant from the VCS 1 described above. In other embodiments, the reminders may be received from a nomadic device (e.g., and without limitation, a mobile phone) or a personal computer (e.g., and without limitation, when using VOIP).

The VCS 1 may be configured with one or more modules for providing reply reminders to the vehicle occupant. As illustrated in FIG. 2 for clarity, these modules may be installed as separate components on the VCS 1. Alternatively, the logic of the separate modules illustrated in FIG. 2 may be programmed in a single component module. Further, some or all of the modules may be implemented on the VCS 1 as, or a combination of, software, firmware, or hardware.

Of course, the illustration of FIG. 2 is non-limiting in that the operations and functions are not required to be performed by the individual modules as described below. Any module may perform any of the functions and operations. Further, the operations and function may be performed by a single component module.

In some embodiments, the modules may be hard coded to the VCS 1. Additionally or alternatively, the modules may be installed to the VCS 1 via a computer readable medium, such as a CD-ROM, DVD, or USB, and/or downloaded via the Internet 61. As a non-limiting example of an Internet download, the program may be obtained from a website such as www.syncmyride.com or a third-party application provider.

The various embodiments are described in the context of missed phone calls received on a nomadic device. However, the various embodiments can also be applied to other forms of communications without departing from the scope of the invention. Non-limiting examples of such communications include electronic mail (which may or may not be stored on remote system, such as (and without limitation) a third-party email service), text messages, MMS messages, messages received on a social networking site, communications received at a personal computer (e.g., VOIP, instant messaging, etc.), and other like communication.

As calls are made, received, and/or missed on the ND 53, which may be connected to the VCS 1 via a wireless connection (e.g., and without limitation, BLUETOOTH), the calls may be logged and stored as nomadic device data 101 (e.g., and without limitation in a call history log) on the ND 53. Additionally, the calls may be stored in a call history log on the VCS 1. The VCS 1 may store calls received on the ND 53 using call history log data exchanged between the VCS 1 and the ND 53 via the wireless connection. The call history logs stored on the ND 53 and/or the VCS 1 may be visible to a user.

The ND 53 and/or VCS 1 may also store as nomadic device data 101 contact information for one or more of the user's contacts. Contact information may include a name and a phone number of the contact. In some embodiments, additional information about the contact may be stored including, but not limited to, relationship to the user, electronic mail address, home address, business address, and additional phone numbers. Certainly, other information may also be included without departing from the scope of the invention.

A call tracking and correlation module 102 may track the calls to and from the ND 53. The tracked information (which may be stored in memory of the VCS 1) may include the identification information of the caller which may include at least a phone number of the caller. If the caller is stored as a contact in the ND 53, additional identification information may also be included such as the caller's name. Additionally, module 102 may monitor and record, or otherwise obtain, the time and date of the incoming, outgoing, and/or missed calls.

The tracking and correlation module 102 may also correlate outgoing calls with missed calls. For example, and without limitation, the correlation may be based on the phone number of the missed call/person called. As a specific non-limiting example, the module 102 may compare the phone number of the outgoing call with the numbers in the missed call log to find a match.

In some embodiments, if a match is found, the module 102 may associate an identifier with the outgoing call and/or the missed call signifying the correlation/match. This correlating identifier may signify that the missed call has been returned or answered. The identifier may be used by the reminder generation module 106 to determine for which missed calls to transmit a callback reminder. As a non-limiting example, module 106 may identify the missed calls having an associated identifier and provide the callback reminders for the missed calls not having the detected association. The outgoing and missed calls, along with the associated identifier, may be stored in memory of the VCS 1, the ND 53, or both.

In some embodiments, the system 100 may include a callback prioritizing module 104. The callback prioritizing module 104 may gather information about the calls and/or callers so that certain callback reminder alerts may be prioritized (e.g., given priority over other callback reminder alerts). The prioritizing information may be gathered from outgoing, incoming, and/or missed called. As non-limiting examples, prioritizing information may include, but is not limited to, the length of a connected call, the frequency (e.g., based on a period of time) of incoming, outgoing, and missed calls to and from a person, the number of incoming, outgoing, and missed calls to and from a person, tagged contacts (e.g., signifying "favorite" contacts or the like) on the ND 53 and/or VCS 1, and/or relationship information associated with the contacts.

In some embodiments, prioritizing information may also be stored and obtained from a system 108 located remote from the vehicle 31 and communicating with the vehicle 31 over a network (e.g., the Internet) 61. The system 108 may be a server and database system. In some embodiments, the prioritizing information may be stored in a profile stored on the database. The profile may be associated with one or more of a user, nomadic device (e.g., a mobile phone), and/or the vehicle.

Generally, the module 106 may transmit callback reminders in chronological order based on when the missed calls were received. However, the prioritizing information may be used to give certain reminders priority. Thus, as a non-limiting example, these reminders may be transmitted out of turn (e.g., earlier than non-priority reminders). In some embodiments, priority reminders may be associated with a priority designation used to identify that the reminders are priority reminders.

By way of example, and not limitation, a user may receive a missed call reminder for a missed call that was received multiple times but never returned by the user. Accordingly, the module 106 may determine that the reminder transmitted to the user is a priority reminder (e.g., based on information from the module 104). Despite a single missed call received prior to the multiple missed calls, a reminder for the multiple missed calls may be transmitted to the user before a callback reminder for the single missed call. As another non-limiting example, a missed call received from the user's family member or a tagged contact (e.g., determined from information associated with the contact and/or profile information from system 108) may be given priority over a missed call received from a non-family member or a contact not tagged.

A missed call may also comprise multiple prioritization information. As a non-limiting example, a tagged family member may call multiple times without the call recipient returning the call. In this non-limiting example, there are three pieces of prioritizing information: (1) tagged contact, (2) relationship, and (3) multiple calls. Certainly, other permutations of prioritization information may exist.

Callback reminders may be transmitted by the callback reminder module 106 based on a monitored passage of time by the module 106 since the missed call was received. The module 106 may monitor the passage of time based on the timestamp and datestamp associated with the missed call(s) found in the tracking information from module 102. Further, the module 106 may determine, generate, and transmit priority reminders based on the prioritizing information obtained from module 104.

The reminder generating module 106 may monitor time and date information 110 gathered from the vehicle to determine whether the timeframe for returning the call has passed. Time and date information may be obtained from the vehicle clock, the vehicle GPS system, and/or the ND 53. Accordingly, the system 100 may provide a user a period of time within which answering missed calls may be initiated by the user before the reminder alert is transmitted. This period of time for measuring a user-initiated callback (also referred to herein as a "callback period") may be preprogrammed to the module 106 (e.g., and without limitation, in hours, days, weeks, and the like).

In some embodiments, this period of time may be defined by the user. As a non-limiting example, the user may have a user profile associated with the system 100 through which the user may set this period of time (e.g., and without limitation, when setting up and/or updating the profile). The user configured time may be defined from a remote device (including, but not limited to, the ND 53 or a personal computer) and transmitted to the module 106 using the Internet 61. Alternatively, the user configured time may be defined from the ND 53 and transmitted over the in-vehicle wireless connection.

In some embodiments, the user configured time may be limited by a maximum time programmed to the module 106 that may elapse.

When the time period has elapsed, the callback reminder module 106 may transmit reminders in the vehicle 31. In some embodiments, the reminders may be queued for transmission and triggered at the delivery time. The language in the reminder(s) may be predetermined except for the callback identification information (e.g., a contact name and/or number) which may be input by the module 106 (e.g., based on information obtained from module 102). Other information that may be input by the module 102 into the reminder may be time of the last call, date of the last call, and/or the amount of time that has elapsed since the missed call was received. In some embodiments, the reminder language may be entirely generated by the system 100.

If the system 100 provides priority reminders to the user, these reminders may have a different user-initiated callback period of time than non-priority reminders. The system 100 may transmit priority reminders to the user automatically, based on the presence of one or more prioritization factors (described above), if the time period has elapsed. In this case, the reminder module 106 may use decision logic about the missed call, based on the prioritizing information, to determine when to transmit the reminder. For example, the prioritizing information may indicate to the module 106 that the call may be an emergency (e.g., multiple calls). As another non-limiting example, the prioritizing information may indicate that the caller is a person known to the user and to whom that user wants to speak (a tagged contact or based on a relationship). Thus, the module 106 may advance the transmission time for the callback reminder for these missed calls despite the predefined callback period. By way of example, and not limitation, the module 106 may automatically shorten this user-initiated callback period.

In some embodiments, the transmission time among priority reminders may also be prioritized. As a non-limiting example, a reminder to call back a caller who has called multiple times may be transmitted earlier than a callback reminder for a caller tagged on the ND 53. As another non-limiting example, a callback reminder for multiple calls from a tagged caller may be sent earlier than a callback reminder for multiple calls from an unknown caller (e.g., a caller who is not in the user's phone contacts).

The system 100 may also determine when to transmit callback reminders based on in-vehicle data 112. Such vehicle data may include, but is not limited to, the presence of other occupants in the vehicle, distance of travel, hard braking, continuous braking, vehicle transmission status, vehicle speed, idle engine, and use of media in the vehicle. The module 106 may receive data from one or more sensors and/or vehicle modules within the vehicle defining the in-vehicle data. As a non-limiting example, the vehicle 31 may be outfitted with weight sensors on the seats which the module 106 may use to identify that other occupants are in the vehicle. Additionally or alternatively, the module may communicate with a seatbelt sensor or microphone 29 to identify the presence of other occupants. Other non-limiting sensors and modules from which the module 106 may obtain in-vehicle data include navigation 54 or 60, audio, a brake control module, and/or an engine control module. The data received from the sensors and/or modules may be communicated over a vehicle network (e.g., a CAN network).

As a non-limiting example of using in-vehicle data, the VCS 1 may detect more than one voice in the vehicle via microphone 29 and voice recognition software installed on the VCS 1. If the VCS 1 detects multiple voices, the module 106 may utilize this information as an indication that the user is occupied and therefore cannot return the missed call at that moment. The same determination may be made based on information from seatbelt sensors and/or weight sensors. Accordingly, based on this detection of multiple voices, the module 106 may not transmit a missed call reminder due to be transmitted.

As another non-limiting example, if the user is on a long distance drive (e.g., and without limitation, based on information from the navigation system), a call back reminder may be transmitted earlier than when it is otherwise due to be received by the user on the basis that the long drive provides a good opportunity to complete the call. Alternatively, a short distance may indicate that a call cannot be completed and, therefore, the reminder may not be transmitted.

In some instances, a user may desire to answer the missed call at a later time. One non-limiting example maybe when the user is on a short drive as in the example above. In such cases, a reminder may be transmitted, but additionally include a query asking if the user desires to call back the missed call later. If so, another callback reminder for this missed call may be provided again at a later time. Accordingly, the module 106 may use decision logic (as described above) to determine when to transmit this query.

In some embodiments, the reminder may also provide the user a choice from multiple forms of communication through which to respond to an unanswered communication. Thus, as a non-limiting example, the user may respond to a missed call via electronic mail, text message, or other like communication. Similarly, the user may respond to an unanswered electronic mail message via a return phone call, text message, or other like communication. In such an instance, the VCS 1 may be outfitted with speech-to-text software for transcribing the spoken message. The data reply (e.g., and without limitation, electronic mail or text message) may be transmitted via the Internet, DoV, or other like communication network.

The user may complete the callback by retrieving the contact from the ND phonebook, returning the call from the call history log, or manually inputting the number to call back. Additionally or alternatively, the callback reminder message may include the callback information which may be selected from the reminder by the user to return the call.

When reminders are transmitted from the module 106, the alert may be output to the user via speaker 13 and/or display 4. If the user is asked to respond, the response may be input via an audible (e.g., and without limitation, voice) and/or tactile input.

If the user is using the nomadic device when a reminder is due, the reminder may or may not be transmitted. In some embodiments, the reminder(s) may be queued until the user terminates the phone call. When the call is terminated, the reminder may be output to the user. In further embodiments, an indicator may be displayed (e.g., during the call) on display 4 representing that a callback reminder has been issued.

Figure 3:
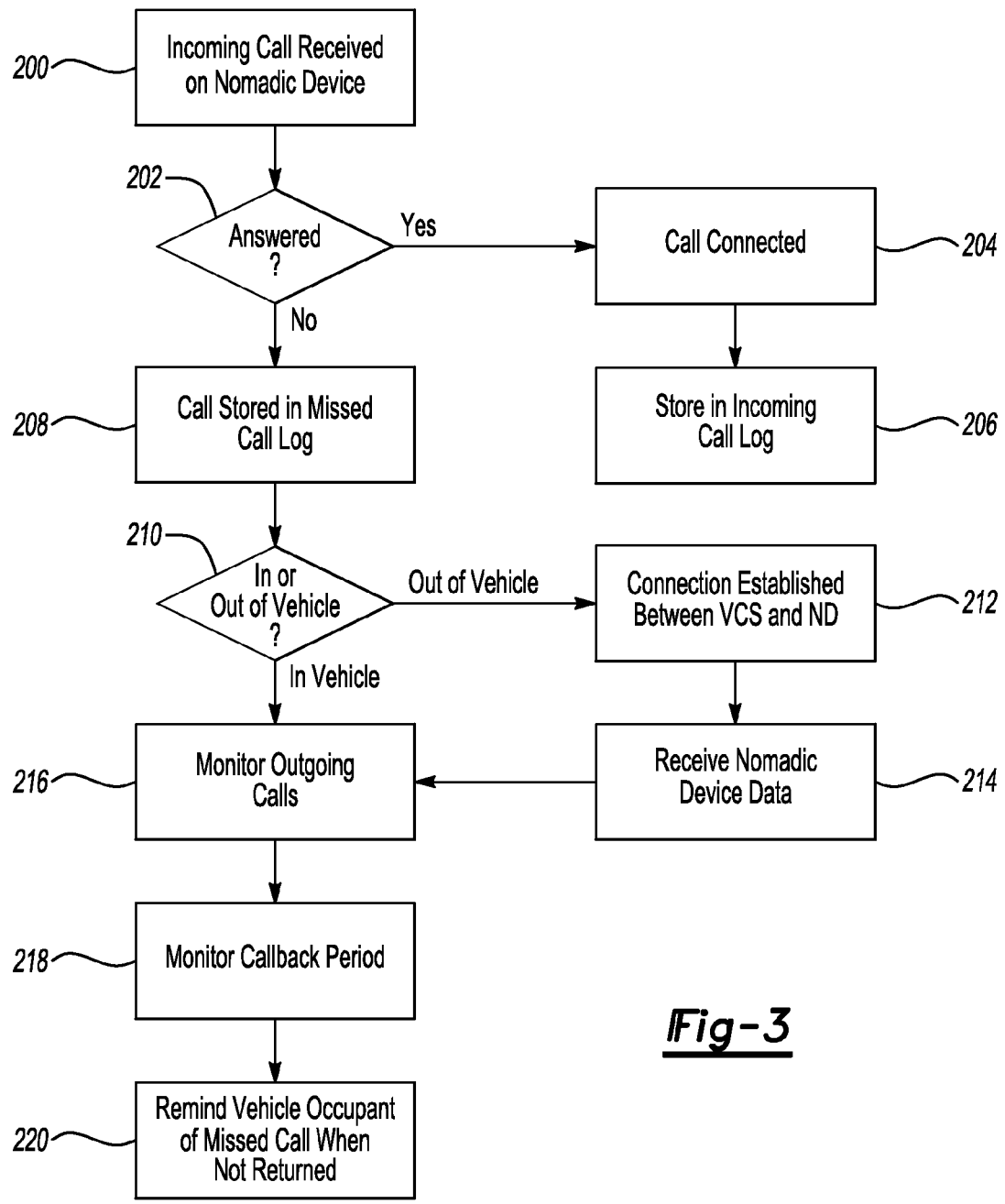
FIG. 3 illustrates a reply reminder issuing operation according to one embodiment.

FIG. 3 illustrates the process associated with generating and transmitting reminders according to one of the various embodiments. It will be appreciated that the disclosure and arrangement of FIG. 3 may be modified or re-arranged to best fit a particular implementation of the various embodiments of the invention.

Some of the process may be performed outside of the vehicle. For example, a user may receive callback reminders for missed calls that may be received when the user is not in the vehicle. Whether it is in or out of the vehicle, an incoming call is received on the ND 53 (block 200). If the call is answered (block 202), the incoming call is connected (block 204) and stored in the call history log (e.g., as an incoming call) (block 206) on the ND 53 and/or the VCS 1. If not answered, the call is stored in the call history log as a missed call (block 208). If the call is received outside of the vehicle, the missed call may be stored as a missed call on the ND 53. If the call is received while in the vehicle, the missed call may be stored in the call history log on the ND 53 and/or the VCS 1.

As briefly described above and further described below with respect to FIG. 4, the system 100 may monitor a call history log for outgoing and missed calls so that reminders may be output if a missed call has not been returned. Therefore, if a missed call is received when the user is not in the vehicle (block 210), the module 106 may not be able to make its determination without a connection to the ND 53. Accordingly, a connection between the VCS 1 and the phone may need to be established. Once established (block 212), the missed calls and outgoing calls may be received from the nomadic device data 101 (block 214). Where a call is received within the vehicle (block 210), the ND-VCS connection may already be established.

At the vehicle 31, the outgoing calls may be monitored for correlation with the missed calls (block 216). Step 216 may also include comparing the missed calls received outside of the vehicle to the outgoing calls made outside of the vehicle to identify which missed calls have been returned and, therefore, not requiring a callback reminder.

As the outgoing calls are monitored/tracked (block 216), the module 106 may also monitor and determine the amount of time that has elapsed since the missed call was received (block 218). A reminder may be generated and transmitted to the user if the user does not initiate a call back before the time has elapsed (block 220).

Figure 4:
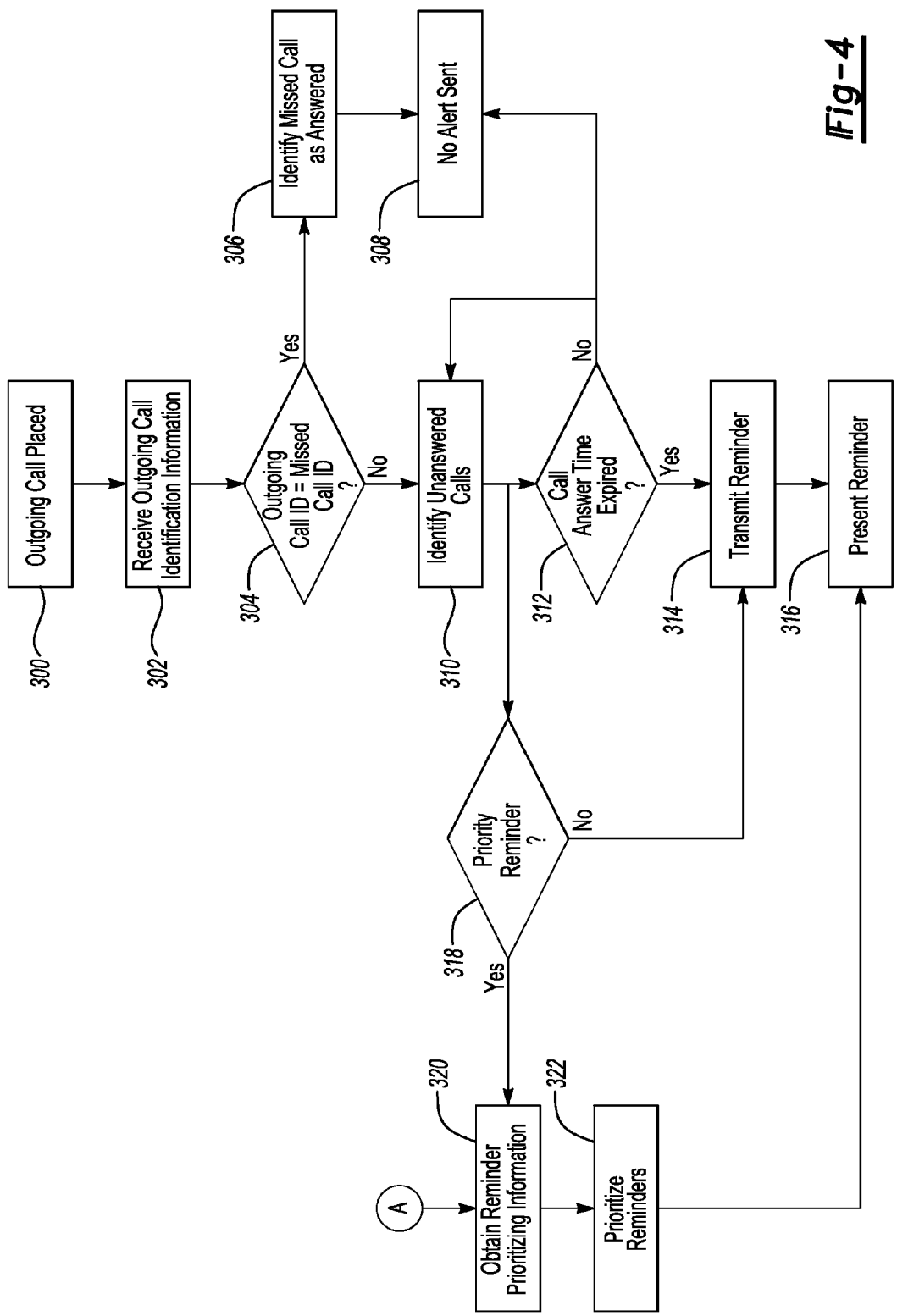
FIG. 4 illustrates the operation for determining the events enabling reply reminders to be transmitted and the types of reminders that are issued by the system according to one embodiment.

FIG. 4 illustrates in further detail the logic that the module may perform in issuing callback reminders. As with FIG. 3 above, in some instances, some of the steps may be performed outside of the vehicle. For example, the outgoing call may be placed outside of the vehicle (block 300). In this case, the relevant steps described with respect to FIG. 3 may additionally be performed. Further, it will be appreciated that the disclosure and arrangement of FIG. 4 may be modified or re-arranged to best fit a particular implementation of the various embodiments of the invention.

After the outgoing call is placed (block 300), the identification information of the outgoing call may be obtained (block 302) by the module 106. This information may include, but is not limited to, the phone number dialed and/or the contact name.

The outgoing call may be compared to the missed calls to determine if there is a correlation or congruence between the outgoing calls and any missed call (block 304). If there is a correlation or congruence between the missed and outgoing call, the correlating missed call may be identified as answered (block 306). In some embodiments, a visual representation that the missed call has been answered may be displayed on the display 4 and/or on the ND 53. If the missed call is identified as being answered, a reminder alert may not be transmitted (block 308).

In some embodiments, after the missed calls are received, the number of missed calls may be assigned and stored with associated preset inputs (also referred to herein as "presets"). The presets for the missed calls may be displayed on display 4 and/or ND 53 and identified by numbers, letters, characters, graphics, and other like identifiers. The user may use audible and/or tactile inputs to select a preset. The presets may additionally be controlled using a physical keypad, dial, keyboard, or buttons in the vehicle (e.g., and without limitation, on the centerstack) or on the ND 53.

Using a preset to select a missed call may be helpful when the missed caller is not stored as a contact on the ND 53. Instead, the user may, for example, initiate the return call by selecting the presets or saying the identifier associated with the preset.

In some embodiments, the arrangement of the presets may be dynamically modified. For example, the presets may be rearranged based on the prioritization information. As another non-limiting example, the missed calls that have been answered may be purged. In one embodiment, the arrangement and rearrangement of the presets may serve as an additional callback reminder for the user.

Referring back to block 304, if the outgoing call does not match a missed call, the unanswered call(s) may be identified (block 310). Of course, steps 306 and 310 may occur simultaneously or near simultaneously. For example, and without limitation, the user may respond to a missed call, but receive a reminder alert for another missed call that has not yet been returned.

As described above, the module 106 may monitor the passage of time to determine whether the period for a user initiated call back has passed. Thus, for the unanswered calls, it may be determined whether the time period has passed (block 312). If not, an alert may not be transmitted. Additionally, the module 106 may continue to identify the unanswered calls, including newly received missed calls (block 310).

If the time has expired, the alert reminder may be transmitted (block 314) and presented to the user (block 316).

As represented by block 318, it may be determined if any unanswered calls include prioritization information. If not, the reminder may be transmitted (block 314) and presented (block 316) as described above.

Otherwise, the prioritizing information may be obtained from a missed call (block 320). The reminders may be prioritized as described above (block 322). The reminder may be transmitted (block 314) and presented to the user (block 316).

Figure 5:
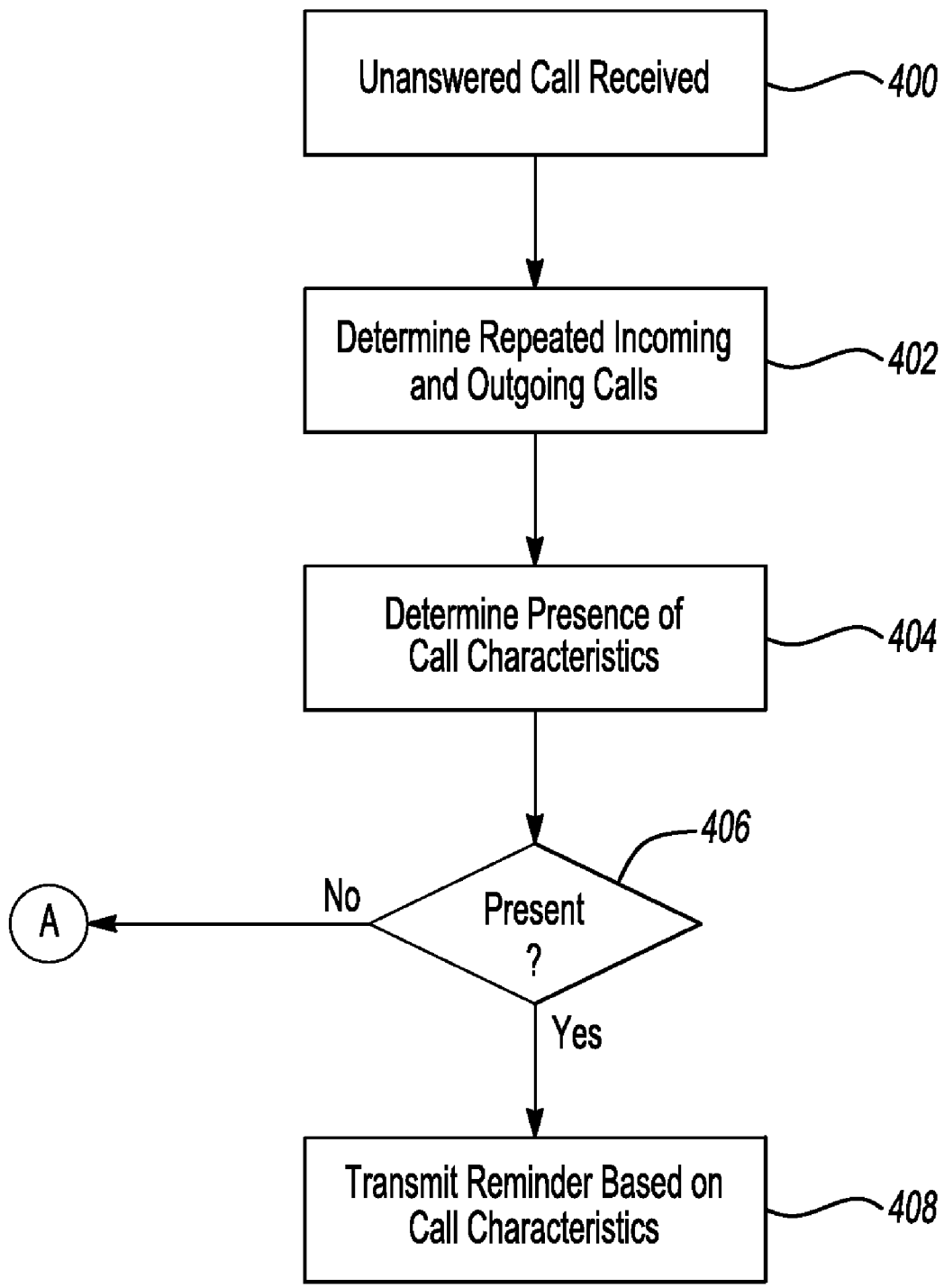
FIG. 5 is the operation defining when the reminders may be transmitted according to another embodiment.

FIG. 5 illustrated another embodiment of the callback reminder issuing process. It will be appreciated that the disclosure and arrangement of FIG. 5 may be modified or rearranged to best fit a particular implementation of the various embodiments of the invention.

As illustrated in FIG. 5, the reminders may be provided based on characteristics about repeated incoming and outgoing calls from the ND 53 (e.g., in or out of the vehicle 31). Call characteristics may include, but are not limited to, frequency of incoming/outgoing calls to a particular person, length of incoming/outgoing calls to a person and/or a time or timeframe within which an incoming call is received from or outgoing call is made to a person. Additionally or alternatively using one or more of these call characteristics, the module 106 may determine when to transmit a callback reminder alert. For example, and without limitation, the user may be provided with reminder(s) at particular times.

As illustrated in block 400, the unanswered call may be received. The module 106 may determine the presence of any repeated incoming and outgoing calls (block 402). Further, the presence of any call characteristics of the repeated incoming and outgoing calls may be obtained (block 404). If the call characteristics are not present in the incoming and/or outgoing calls, the steps (continued at circle block A) may be performed.

If one or more call characteristics are present (block 406), the callback reminder may be transmitted based on the existence of the call characteristics (block 408). As a non-limiting example, it may be determined that an incoming and/or outgoing call is made to a particular contact between 6 PM and 8 PM everyday. After the user enters the vehicle 31 during that timeframe, and if a missed call from the contact has not yet been returned, a reminder may be provided to the user to call back the contact. In some embodiments, the module 106 may wait to determine if the user initiates the return call before the reminder is presented.

As another non-limiting example, if the user speaks to a contact everyday (or every few days or every weeks, etc. and at no particular time) and a missed call from the contact has not been returned, the user may be provided a callback reminder after entering the vehicle 31 based on the frequency pattern of the calls (e.g., every day, every other day, every week, etc.). In some embodiments, the module 106 may wait to determine if the user initiates the return call before the reminder is presented (e.g., and without limitation, if calls are made everyday, a reminder may not be provided until the next day when the user enters the vehicle if the user has not already returned the call).

In one or more embodiments described above, the user may have the option to override/suspend the presentation of callback reminders. Accordingly, the user may not be presented with callback reminders if an override is set. The user override may cause the suspension of all callback reminders. Alternatively or additionally, a user may select which call back reminders to suspend.

While exemplary embodiments are illustrated and described above, it is not intended that these embodiments illustrate and describe all possibilities. Rather, the words used in the specification are words of description rather than limitation, and it is understood that various changes may be made without departing from the spirit and scope of the invention.

What is claimed:

1. A computer-implemented method for providing reply reminders to a vehicle occupant in a vehicle, the computer-implemented method comprising:
    wirelessly receiving at a vehicle computer information indicating one or more unanswered communications from a nomadic telephone device;
    receiving at the vehicle computer time and/or date information for the one or more unanswered communications;
    defining a reply period based on the time and/or date information;
    automatically monitoring at the vehicle computer a passage of time based on the reply period;
    determining at the vehicle computer if the one or more unanswered communications have been answered within the reply period;
    generating a reminder at the vehicle computer if the one or more unanswered communications have not been answered within the predefined reply period;
    presenting the reminder in a vehicle;
    receiving information, stored on a computing system remote from the vehicle, designating the one or more unanswered communications as a priority;
    designating the one or more unanswered communications as a priority based on the information; and
    modifying the reply period based on designating the one or more unanswered calls as a priority.

2. The computer-implemented method of claim 1 wherein the information includes relationship information between a caller and a call recipient.

3. The computer-implemented method of claim 1 wherein the information is stored on a computing system remote from the vehicle.

4. A system for providing callback reminders to a vehicle occupant in a vehicle, the system comprising:
    at least one vehicle computer configured to:
        receive information defining one or more unanswered calls from a nomadic telephone device;
        receive information defining multiple connected incoming calls and/or multiple outgoing calls from the nomadic telephone device;
        identify one or more call characteristics of the incoming calls and/or outgoing calls;
        determine if the one or more unanswered calls have been answered;
        determine when to present a callback reminder based on the one or more call characteristics;
        if the one or more unanswered calls have not been answered, present a callback reminder in the vehicle based on when to present the callback reminder;
        receive time and/or date information for the one or more unanswered calls;
        define a callback period based on the time and/or date information, wherein the at least one computer is configured to determine if the one or more unanswered calls have been answered within the callback period;
        receive information, stored on a computing system remote from the vehicle, designating the one or more unanswered calls as a priority;
        designate the one or more unanswered calls as a priority based on the information;
        and modify the callback period based on designating the one or more unanswered calls as a priority.

5. The system of claim 4 wherein the information includes relationship information.

6. The system of claim 4 wherein the at least one vehicle computer is configured to further prioritize multiple unanswered calls designated as a priority.

* * * * *